United States Patent
Zeng et al.

(10) Patent No.: US 6,897,783 B2
(45) Date of Patent: May 24, 2005

(54) ELECTRICAL INJURY PROTECTION SYSTEM USING RADIO FREQUENCY TRANSMISSION

(75) Inventors: Shengke Zeng, Souderton, PA (US); John R. Powers, Jr., Morgantown, WV (US); Larry L. Jackson, Morgantown, WV (US); David L. Conover, Bethel, OH (US)

(73) Assignee: The United States of America as represented by the Department of Health and Human Services, Washington, DC (US)

( * ) Notice: Subject to any disclaimer, the term of this patent is extended or adjusted under 35 U.S.C. 154(b) by 231 days.

(21) Appl. No.: 10/204,031

(22) PCT Filed: Feb. 23, 2001

(86) PCT No.: PCT/US01/40181

§ 371 (c)(1), (2), (4) Date: Aug. 14, 2002

(87) PCT Pub. No.: WO01/67418

PCT Pub. Date: Sep. 13, 2001

(65) Prior Publication Data

US 2003/0011484 A1 Jan. 16, 2003

Related U.S. Application Data

(60) Provisional application No. 60/186,860, filed on Mar. 3, 2000.

(51) Int. Cl.$^7$ .............................................. G08B 21/00
(52) U.S. Cl. ........................ 340/635; 340/657; 340/660; 340/661; 340/573.1; 340/539.1; 340/539.11; 340/539.21
(58) Field of Search .................................. 340/635, 657, 340/660, 661, 573.1, 539.1, 539.11, 539.21, 573.4, 539.26, 636.1; 324/457

(56) References Cited

U.S. PATENT DOCUMENTS

| | | | |
|---|---|---|---|
| 3,309,690 A | | 3/1967 | Moffitt |
| 3,784,842 A | | 1/1974 | Kremer |
| 4,532,501 A | | 7/1985 | Hoffman |
| 4,983,954 A | | 1/1991 | Huston |
| 5,252,912 A | * | 10/1993 | Merritt et al. ................ 324/72 |
| 5,461,365 A | | 10/1995 | Schlager et al. |
| 5,952,820 A | | 9/1999 | Thrasher et al. |
| 6,002,348 A | * | 12/1999 | Greene et al. .............. 340/963 |

* cited by examiner

Primary Examiner—Julie Bichngoc Lieu
(74) Attorney, Agent, or Firm—Klarquist Sparkman LLP

(57) ABSTRACT

A personal electrical injury protection system is provided which can be worn by electricians, construction workers, or other individuals working around or with low-voltage lines (i.e. generally less than about 600 volts). The personal electrical injury protection system has both a proximity warning component which provides a warning of potential electrical hazards upon close approach to the low-voltage power line and an electrical contact protection component which turns off the power upon actual electrical contact with the power line. The present personal electrical protection system relies on a radio frequency transmitter attached to the worker or person to be protected and a radio receiver/controller connected to the power line. The radio frequency transmitter has a low frequency generator which is used for electrical-contact protection and a high frequency generator which is used for proximity warning.

33 Claims, 8 Drawing Sheets

Mean RF Transmission Loss vs. Freq. and Distance

Mean RF Transmission Loss vs. Distance and Frequency

ELECTRICAL INJURY PROTECTION SYSTEM USING RADIO FREQUENCY TRANSMISSION

CROSS-REFERENCE TO RELATED APPLICATIONS

This is the National Stage of International Application No. PCT/US01/40181, filed Feb. 23, 2001, and claims the benefit of U.S. Provisional Application No. 60/186,860, filed Mar. 3, 2000.

FIELD OF THE INVENTION

The invention relates to electrical injury protection systems and, more particularly, to personal electrical protection systems which provide warnings of potential electrical hazards upon close approach to low-voltage power lines (generally less than about 600 volts) and which turn off the power upon electrical contact with the power line. The present personal electrical injury protection systems relies on a radio frequency transmitter attached to the worker or person to be protected and a radio receiver/controller connected to the power line.

BACKGROUND OF THE INVENTION

Electrocution is a serious cause of occupational fatality which ranked fifth among occupational fatalities in the United States from 1980 to 1995 with 6,242 electrocution deaths. NIOSH (1999), National Traumatic Occupational Fatalities (unpublished data), Division of Safety Research, National Institute for Occupational Safety and Health, Morgantown, W. Va. An investigation of 98 occupational electrocution fatalities showed that 54% of the victims were working around an electrical circuit that was not de-energized and 97% of these victims were injured by power lines which were not equipped with ground fault circuit interrupters. NIOSH (1994), Fatality Assessment and Control Evaluation Database (unpublished data), Division of Safety Research, National Institute for Occupational Safety and Health, Morgantown, W. Va.

Techniques which have been used to prevent such electrocutions include, for example, de-energizing power lines before working in the area, maintaining appropriate distances from energized lines, and barriers to prevent electrical contact with energized lines. Oftentimes, however, these methods are not practical, not used properly, or are simply ignored by individuals working with or around electrical power lines. Accordingly, there remains a need for an electrical protection system for individuals working with or around power lines which will warn of the potential for electrocution and will, if electrical contact is made with the power line, de-energize the power line to prevent and/or minimize injury due to electrocution. A low cost and reliable electrical injury protection system with (1) an alarm mechanism for warning personnel as to electrocution hazards and (2) an automatic circuit-breaker and/or ground-fault-circuit-interrupter tripping mechanism for minimizing the risk of electrocution would be desirable.

SUMMARY OF THE INVENTION

In accordance with the present invention, an electrical injury protection (EIP) system is provided that consists of a worker-worn low-power radio-frequency (RF) body transmitter which transmits an RF signal (generally in the range of 50 kHz to 2 MHz) throughout a worker's body and a receiver that is plugged into any receptacle of the energized power line. By using the specific characteristics of the RF signal transmission between the body transmitter and the power line in this frequency range, this system provides a proximity sensing alarm as well as an electrical contact sensor. The receiver preferably has a proximity-dependent alarm or warning device which is activated as the worker approaches the energized power line. An especially preferred alarm is a proximity-dependent audible alarm which "chirps" or sounds at increasing frequency as the worker approaches the line. If the worker makes electrical contact with the power line, the receiver preferably has a tripping mechanism that trips the circuit breaker and/or ground fault circuit interrupter (if present) and thereby de-energizes the power line before serious injury can occur. When activated, the fast-acting tripping mechanism causes an artificial excessive line-neutral current to trip the circuit breaker of the power line and also causes an artificial excessive line-ground current to trip the ground fault circuit interrupter (if present) of the power line.

Although the present personal protection systems and devices are mainly designed for use by electricians and construction workers, they may be used by other individuals who work in areas with hazards associated with low-voltage (<600 V) power lines. If desired, these systems could also be used by, for example, the home handy man or woman working with, or around, home electrical systems.

One object of the present invention is to provide devices and methods which allow both proximity sensing and electrical contact detecting methods using low power RF signal transmission from human body to power line. Another object to provide devices and methods which allow transmission of RF signals throughout a human body by outputting the RF signal through a pair of conductive fabric cuffs or other attachment means attached to a human, which ensures near-uniform RF signal distribution around the human, so that the receiver is able to separately detect the proximity of the human relative to a power line or electrical contact of the human with a power line.

Another object is to provide devices and methods for proximity and/or electrical contact detection of a worker relative to a power line utilizing RF signal transmission in the frequency range between 50 kHz to 2 MHz. In this frequency range, the characteristics of the RF signal transmission between a human body and a low-voltage power line is largely capacitive coupling mixed with some RF radiation. This transmission characteristic enables a monotonic and gradual RF signal increase on a power line as the worker approaches the power line, and also enables a significant RF signal increase if the worker electrically contacts the power line.

Another object is to provide devices and methods for proximity and/or electrical contact detection between a worker and a power line using a RF transmission receiver or controller which can be connected in a convenient and simple manner to the power line. The simplicity of the devices and methods of the present invention are more likely to be used consistently and properly, thereby providing increased protection. In one embodiment of the invention, the receiver and/or controller is connected with the power line through an electrical receptacle of the power line. If desired, the receiver and/or controller can be directly wired or connected to the power line.

Another object is to provide devices and methods for proximity and/or electrical contact detection between a worker and a power line having a tripping mechanism which can de-energize the power line by outputting excessive artificial line-neutral current to trip an existing circuit breaker on the power line and which does not require modification of the circuit breaker. Another object is to provide devices and methods for proximity and/or contact detection between a worker and a power line having a tripping mechanism which can de-energize the power line by outputting excessive artificial line-ground current to trip an existing ground fault circuit interrupter on the power line and which does not require modification of the ground fault circuit interrupter.

Still another object of the present invention is to protect electrical, construction, and other workers from electrical injury by (1) providing body approach warning; (2) extending existing ground fault protection to any electrical contact protection; (3) shortening the circuit breaker tripping delay to provide quicker de-energizing of power lines in case of electrical contact by a worker; and (4) shortening the ground fault circuit interrupter tripping delay to provide quicker de-energizing of power lines in case of electrical contact by a worker.

Still another object of the present invention is to provide a personal electrical injury protection system for use by an individual working near a low voltage power line, the system comprising:

(1) a radio frequency transmitter mounted on the individual's body and having a low frequency radio signal generator, a high frequency radio signal generator, at least two electrodes connecting the radio frequency transmitter to the individual's body, and an alarm;

(2), a radio frequency receiver to pick up the low frequency radio signal and high frequency radio signal from the radio transmitter; and (3) a controller electrically connected to the power line and electrically connected to the radio frequency receiver for receiving the low frequency signal and the high frequency signal from the radio frequency receiver, wherein the controller has an approach warning mechanism to monitor the high frequency signal from the receiver and a quick tripping mechanism to monitor the low frequency signal from the receiver;

wherein the high frequency signal carries information relating to the individual's proximity to the power line and the low frequency signal carries information relating to the individual's electrical contact with the power line, wherein, if the approach warning mechanism detects that the high frequency signal is greater than a first threshold value, an approach warning signal is generated which is transmitted to the alarm and activates the alarm to warn the individual of a close approach to the power line, and wherein, if the quick tripping mechanism detects that the low frequency signal greater than a second threshold, the power line is de-energized to minimize electrical injury to the individual.

Another object of the present invention is a personal electrical injury protection system for use by an individual working near a low voltage power line, the system comprising:

(1) a radio frequency transmitter mounted on the individual's body and having a low frequency radio signal generator, at least two electrodes connecting the radio frequency transmitter to the individual's body, and an alarm;

(2) a radio frequency receiver to pick up the low frequency radio signal from the radio transmitter; and (3) a controller electrically connected to the power line and electrically connected to the radio frequency receiver for receiving the low frequency signal from the radio frequency receiver, wherein the controller has a quick tripping mechanism to monitor the low frequency signal from the receiver;

wherein the low frequency signal carries information relating to the individual's electrical contact with the power line, and wherein, if the quick tripping mechanism detects that the low frequency signal greater than a second threshold, the power line is de-energized to minimize electrical injury to the individual.

These and other objects and advantages of the present devices and methods will be apparent from a consideration of the present specification.

DETAILED DESCRIPTION OF THE PREFERRED EMBODIMENTS

Figure 1:
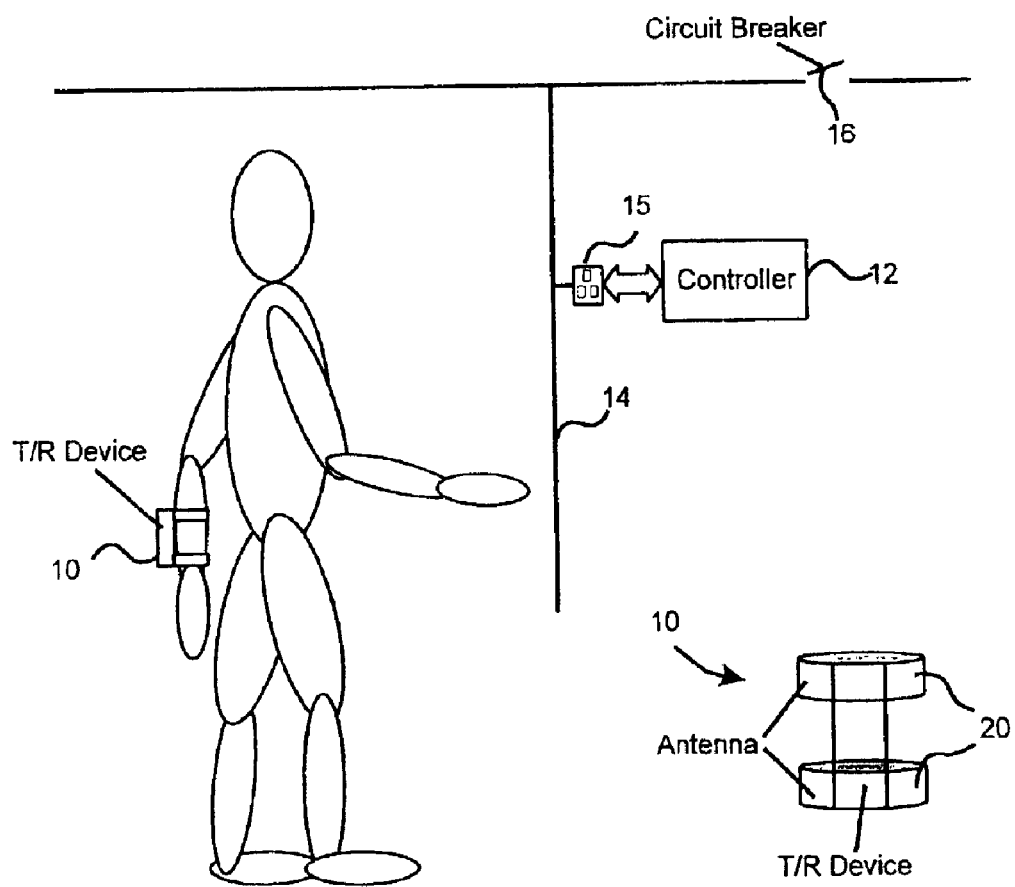
FIG. 1 is a schematic view of an electrical injury protection (EIP) system in accordance with the present invention. This embodiment includes a transmitter attached to the worker's wrist and a receiver/controller attached to the power line. The transmitter 10 is shown in more detail in the lower right hand corner of the figure.

The present electrical injury protection (EIP) system consists of a worker-worn, low-power radio-frequency (RF) body transmitter which transmits an RF signal (generally in the range of about 50 kHz to about 2 MHz) throughout a worker's body and a receiver/controller which is plugged into any receptacle or outlet of an energized power line or otherwise connected to the energized power line in a manner in which, upon actual electrical contact of the worker with the energized power line, the power line is essentially immediately de-energized. The receiver/controller has a proximity-dependent alarm or other warning device which is activated when the worker approaches the energized power line. An especially preferred alarm is a proximity-dependent audible alarm which "chirps" or sounds at increasing frequency as the worker approaches the line. If the worker makes electrical contact with the power line, the receiver preferably has a tripping mechanism that trips a circuit breaker by causing artificial line-neutral over-current and trips a ground fault circuit interrupter (if present) by causing artificial line-ground leakage-current, and thereby de-energizes the power line before serious injury can occur.

The RF signal transmission used in the present electrical injury protection system between the body transmitter and the power line is generally in the frequency range of about 50 kHz to about 2 MHz and is largely capacitive-coupling mixed with some RF radiation. The capacitive-coupling ensures that the RF signal received by the receiver/controller varies monotonically versus the proximity of the worker to the power line. This monotonic RF transmission is appropriate for designing a proximity alarm, since this alarm requires that there is only one RF transmission value corresponding to each distance between the worker and the power line.

At the lower end of the frequency range, there is little radiation effect; thus, the RF transmission increases very little as the worker approaches the power line, but then increases drastically as the worker electrically contacts the power line. At the higher end of the frequency range, there is more radiation effect than at the lower end; thus, the RF transmission increases significantly as the worker approaches the power line, but does not increase drastically as the worker electrically contacts the power line. In the middle of the frequency range, the RF transmission is generally a mix of those at the higher and at the lower end. Careful selection of transmission frequency allows the present electrical injury protection system to act as a proximity sensing alarm as well as an electrical contact sensor.

The present electrical injury protection system in one embodiment has two operating modes. In the first or warning mode, the proximity-dependent alarm is activated as the worker approaches the energized power line. Since the strength of the received RF signal increases as the worker gets closer to the power line, the alarm provides a direct proximity-dependent warning. For example, using an audible warning device, the frequency or amplitude of the alarm could be increased the closer the worker approaches the energized power line. Using a visual warning device, the characteristics of the light (e.g., intensity, color, or pulsing frequency) could be modified to provide more intense warning the closer the worker approaches the energized power line. Of course, other warning devices, or combinations of warning devices, could be used if desired.

The second or electrical-contact mode is activated if the worker electrically contacts the energized power line in spite of the warnings provide by the alarm. When the worker makes electrical contact with the power line, the strength of the transmitted RF signal will increase significantly. The receiver has a tripping mechanism that, when the increased RF signal is detected, trips the circuit breaker and, if present, the ground fault circuit interrupter. In this case, the receiver recognizes the large RF signal strength increase as an electrical contact and immediately outputs an excessive over-current (between the line and the neutral), which is much greater than the current rating of the circuit breaker on the power line. This over-current immediately trips the circuit breaker, thereby de-energizing the power line. Simultaneously, the actuating circuit also outputs an excessive ground current between the line and the ground of the power line to trip any ground fault circuit interrupters on the power line. This excessive ground current is great enough to trip a ground fault circuit interrupter in its minimum reaction time. These two de-energizing actuations work together to ensure that the power to the line is turned off with the maximum speed possible in order to minimize any electrical shock injury.

In one embodiment, the system consists of a battery powered transmitting device which can easily be carried by a worker, an electrode connection which connects the transmitting device to the worker's body, a receiver, and a controller near a circuit breaker. The receiver can be physically incorporated into the controller or can be a separate component electrically coupled to the controller. In another embodiment, another receiver, such as an alarm, may be provided to receive a feedback signal from the controller. Such a receiver can be physically incorporated into the transmitting device so as to provide a combined transmitting/receiving device or alternatively, the receiver may be a separate component electrically coupled to the transmitting device. In a preferred embodiment, the controller is plugged into any one of the receptacles on the power line, thereby providing protection along the power line. The electromagnetic field generated by the transmitting device, the receiving device, and the controller should be below the radio frequency exposure safety limit. (See, e.g., IEEE/ANSI Standard C95.1-1999.)

The electrode connectors used to connect the transmitting device or the combined transmitting/receiving device to the body may consists of, for example, at least two electrodes (preferably three or more electrodes) which are attached to the human body (e.g., on the chest, waist, forearms, legs, and the like) or at least two conductive fabric cuffs positioned on, for example, the wrist(s), upper-arm(s), or ankle(s). Preferably, the transmitting device or the combined transmitting/receiving device can be mounted on a belt, tool holster, helmet, or shoe or can fit into a shirt or other pocket. Preferably, the transmitting device or the combined transmitting/receiving device also has a low-battery warning light or other alarm. Preferably, the transmitting device or the combined transmitting/receiving device also has an "activated" or "armed" warning light or other alarm which can easily be checked by both the worker using the system as well as co-workers or other observers to ensure that the device is being used properly.

This present electrical injury protection system provides a warning signal to the worker when his or her body is too close to a power line. In addition, the system is capable of detecting any type of electrical contact between a human and a low voltage (generally less than about 600 V) electrical power line (i.e., line-line, line-neutral, and line-ground), and essentially immediately cut off the electrical power source. The reaction or delay time of the system preferably is comparable to, or less than, the duration threshold of ventricular fibrillation (about 13 milliseconds) in order to effectively reduce the risk of ventricular fibrillation and the subsequent death of a worker in electrical contact with the power line and to reduce the degree of painful sensation which is directly related to the duration of electrical contact.

Preferably, the present system is used in combination with a Class A ground fault circuit interrupter (GFCI). Such GFCIs can detect only line-ground electrical contact with a typical reaction time from about 16 to 100 milliseconds depending on the strength of the electrical-contact current (about 16 to 20 milliseconds at 80 mA; and about 35 to 100 milliseconds at 6 mA) and do not provide body approach warning. By generating an excessive artificial ground current of over 80 mA, the present system is able to trip the GFCI with its minimum reaction time. This present system can, however, be adapted to protect workers from prolonged electrical shock in a power system without ground fault circuit interrupters.

The present electrical injury protection devices and methods utilize radio frequency (RF) signals coupled from a transmitting/receiving device to a human body. In effect, the human body acts as an antenna such that the RF signals can be transmitted from the human body to a power line through the air by reactive coupling. RF signal power transmission between the human body and the power line can be detected when the body is sufficiently close to the power line (generally in the order of several centimeters) to allow for approach indication and/or warning. If there is actual electrical contact between the human body and power line (whether line-line, line-neutral, or line-ground), the RF signal can be directly transmitted from the human body to the controller through the power line to activate the controller. Because of the much shorter period of RF signals over the 60 Hz current, the reaction time of the RF signal to electrical contact is much shorter than currently available GFCIs (generally a minimum tripping delay time of about 16 to 20 milliseconds for Class A GFCIs).

The personal electrical injury protection systems of the present invention generally employ high frequency (HF) radio signals in the proximity warning component and low frequency (LF) radio signals in the electrical contact injury prevention component. The HF signal generator provides HF frequencies close to or at the higher end of the frequency range of 50 kHz to 2 MHz, with a preferred range of about 200 kHz to about 2 MHz. The LF signal generator provides LF frequencies close to or at the lower end of the frequency range of 50 kHz to 2 MHz, with a preferred range of about 50 kHz to about 200 kHz. The RF transmission between a human body and a power line in the HF range is mainly capacitive and with more RF radiation than that in the LF range. Thus, the RF transmission in the HF range increases monotonically and more gradually than in LF range as the worker approaches the power line; thus, the HF range is suitable to carry proximity information. In contrast, the RF transmission in the LF range increases monotonically and more sharply than in the HF range as the human electrically contacts the power line, and therefore is suitable to carry electrical-contact information.

One embodiment of the electrical injury protection system of the present invention is illustrated in FIG. 1. This system is composed of a combined transmitting/receiving device 10 which is carried or worn by the worker, a controller 12 coupled to a power line 14 through outlet 15, and a circuit breaker 16. The power line 14 is generally a low voltage (<600 V) residential or construction site power system with line, neutral, and/or ground wire bundle. The line and neutral wires are, of course, preferably insulated but could have insulation defects. The present electrical injury protection system can be used to protect individuals working around unshielded or defective shielded power lines. The combined transmitting/receiving device 10 is electrically connected to the worker's body via electrodes 20 and can be held in place with, for example, straps. In operation, the combined transmitting/receiving device communicates with the controller through the following path: (1) the T/R device; (2) the worker's body acting as an effective antenna; (3) air in case of close approach or directly in case of actual electrical contact; (4) the power line; and (5) the controller. The radio frequency output/input electrodes or conductive fabric cuffs 20 of the T/R device 10 are attached to the worker's body (e.g., worker's wrist as shown in FIG. 1) to form a whole human body-effective transmitting/receiving antenna. The controller has an input and output (not shown) coupled to the power line so as to form a power line-effective receiving/transmitting antenna.

Figure 2:
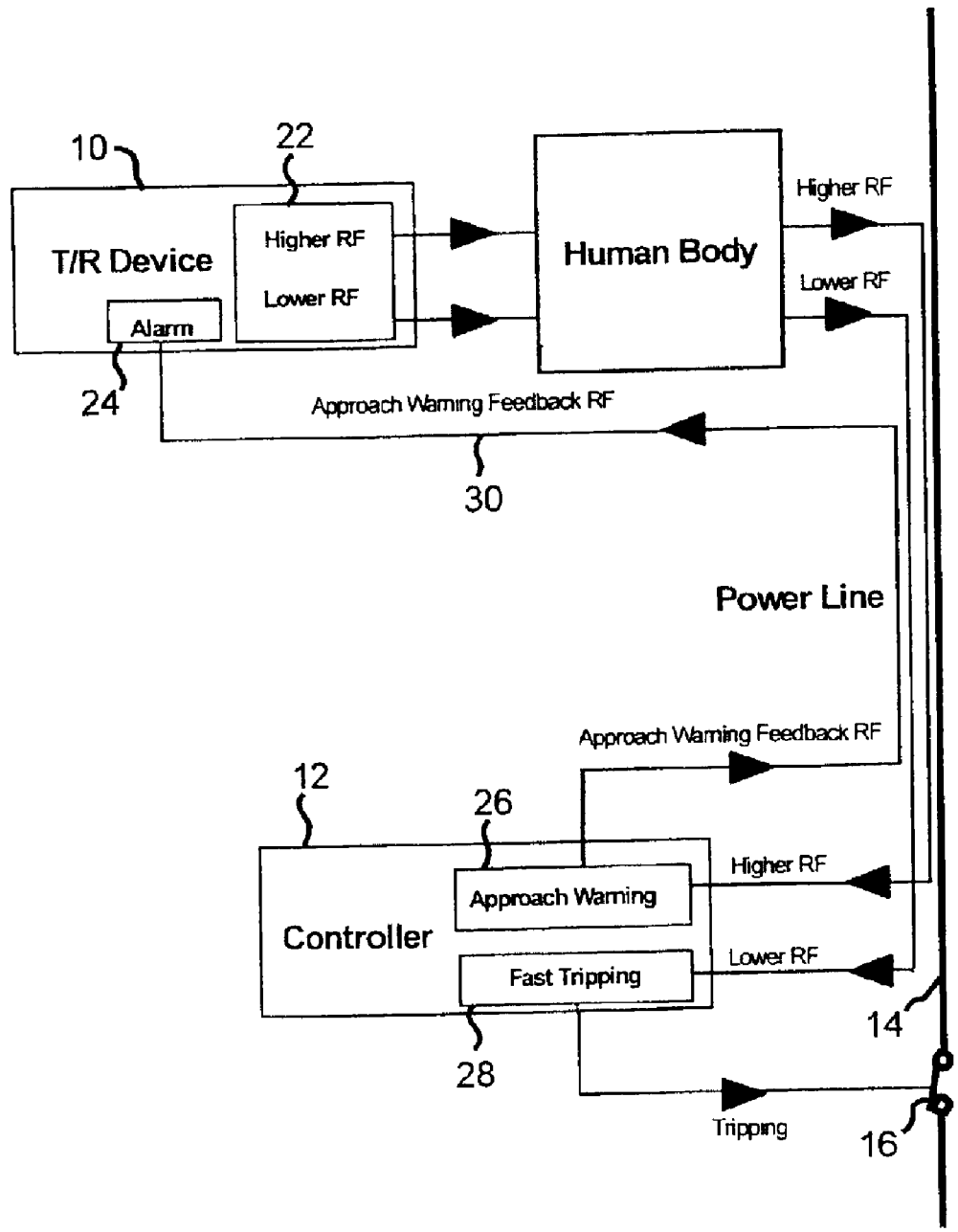
FIG. 2 illustrates one configuration of the present electrical injury protection system using a high frequency signal for proximity sensing, a low frequency signal for electrical-contact sensing, and an approach-warning-feedback radio frequency signal.

A more detailed system configuration of the device of FIG. 1 is shown in FIG. 2. The T/R device 10 of this system is composed of a higher frequency (HF) and lower frequency (LF) signal generator 22 and an alarm mechanism 24. In operation, the T/R device 10 generates pulse coded HF and LF signals, with the magnitude in a preferred range of about 0.5 to about 4 volts, which are transmitted through the human body to the air. The controller 12, which is connected to the power line 14, is composed of an approach warning mechanism 26 and a fast tripping mechanism or quick tripping mechanism 28. The approach warning mechanism 26 monitors the received HF signal power level. If the HF signal level exceeds a specific threshold (i.e., the worker approaches too close to the power line), the approach warning mechanism 26 generates an approach warning feedback RF signal 30, which transmits through the power line-air-human body, to the T/R device 10 to activate the alarm mechanism 24. Alternatively, an alarm may be electrically coupled to the controller 12, in which case the alarm 24 and the approach warning feedback RF signal 30 could be eliminated.

The fast tripping mechanism 28 monitors the LF signal. If the LF signal level exceeds a specific threshold (i.e., there is direct electrical contact), the fast tripping mechanism 28 can either trip an existing GFCI (not shown) and/or a circuit breaker 16 on the power line. If a GFCI is installed on the power line, the fast tripping mechanism artificially causes a great strength of line-to-ground leakage current (over about 80 mA) in order to trip the existing GFCI. Such a current strength is generally sufficient to trip a Class A GFCI in its minimum delay time of about 16 to 20 milliseconds. The fast tripping mechanism also artificially causes a great strength of line-to-neutral over current (i.e., much greater than the current rating of the existing circuit breaker on the power line) in order to trip the circuit breaker 16 within the shortest possible time. The reaction time of circuit breaker tripping is inversely related to the strength of the line-to-neutral over current. In other words, the greater the strength of the over-current, the shorter the reaction time for circuit breaker tripping. Thus, the over current caused by the fast tripping mechanism should large enough to trip the circuit breaker within the shortest possible time without creating a risk of fire. Desirably, the strength of the over current is that which provides for a short reaction time of about 16 to 20 milliseconds (comparable to the minimum delay time of a Class A GFCI). This short reaction time in tripping reduces the worker's risk of ventricular fibrillation as well as the degree of painful sensation normally associated with electrical shock. Preferably, both the GFCI and the circuit breaker 16 are tripped in the case of actual electrical contact to provide maximum protection in the shortest possible time.

Figure 3:
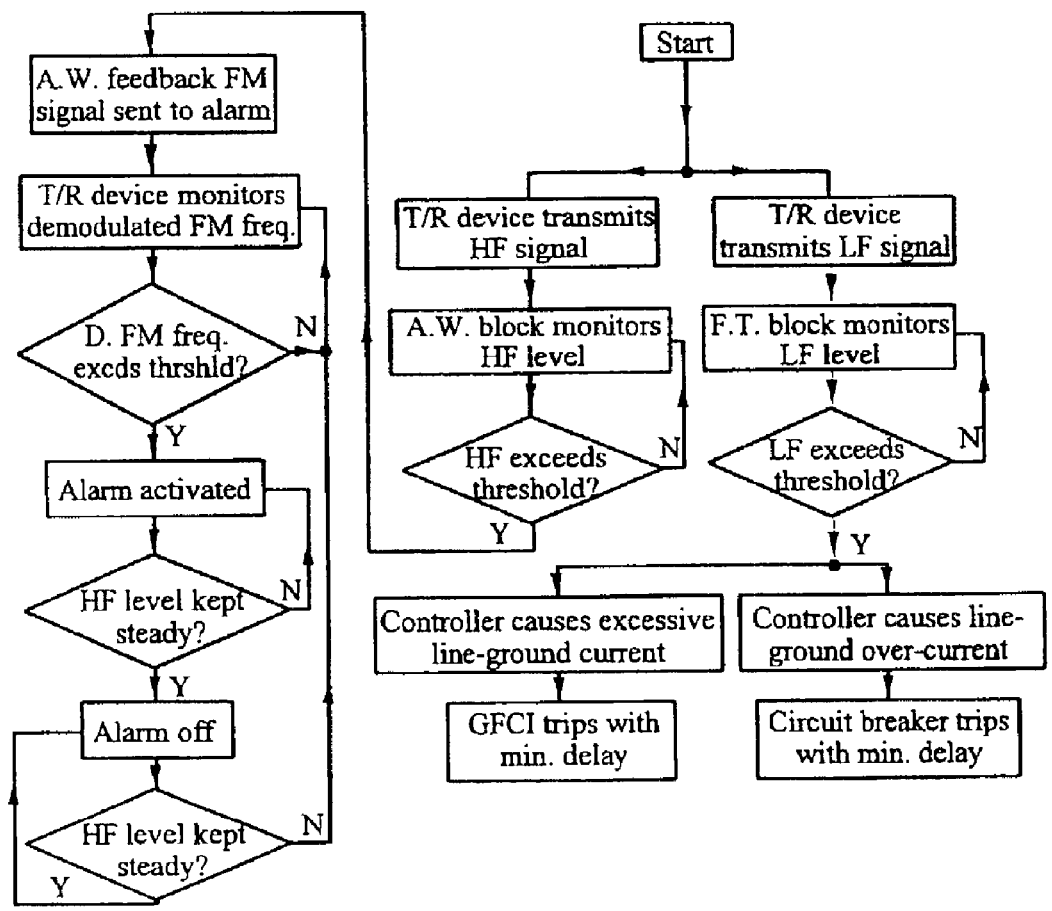
FIG. 3 provides an operational flowchart of the present electrical injury protection system.

The operating flow chart of the system of FIG. 2 is shown in FIG. 3. On operation, the T/R device transmits a low power coded HF signal through the human body into the air. If the worker is too close to the power line, an appropriate amount of HF signals is coupled to the wire and is received by the controller through the following pathway: the T/R device to the human body to the air to the power line, and finally, to the controller. The HF power on the power line is directly related to the closeness of the human body (see FIG. 4A). If the power of the HF signal received by the controller exceeds a specific threshold, this HF signal activates the approach warning mechanism which in turn transmits a frequency-modulated (FM) feedback signal via the following pathway: the controller to the power line to the air to the human body, and finally, to the T/R device. The modulation frequency of the FM signal is directly related to the closeness of the human body to the power line (i.e., the closer the body to the power line, the higher the modulation frequency). The T/R device demodulates the feedback FM signal and monitors the demodulated frequency. If the demodulated FM frequency is higher than a specific threshold, the alarm is activated and a warning signal generated to warn the worker that he or she is too close to a live wire. Preferably, the alarm employs an audible chirp signal whereby the frequency of the chirping conveys additional warning information; using such a variable chirp alarm, the higher the demodulated FM frequency, the higher the chirp pitch. The T/R device monitors the steadiness of the demodulated FM frequency. If the demodulated FM frequency is kept steady for a couple of seconds, the alarm mechanism recognizes that the worker is holding an electrical tool (which can also cause a higher level HF signal received by the controller). The alarm is turned off by the steady demodulated FM frequency. If the demodulated FM frequency becomes unsteady, the alarm mechanism checks whether the demodulated FM frequency is still high (indicating that the body is still too close to the power line). The higher demodulated frequency re-activates the alarm.

Figure 4:
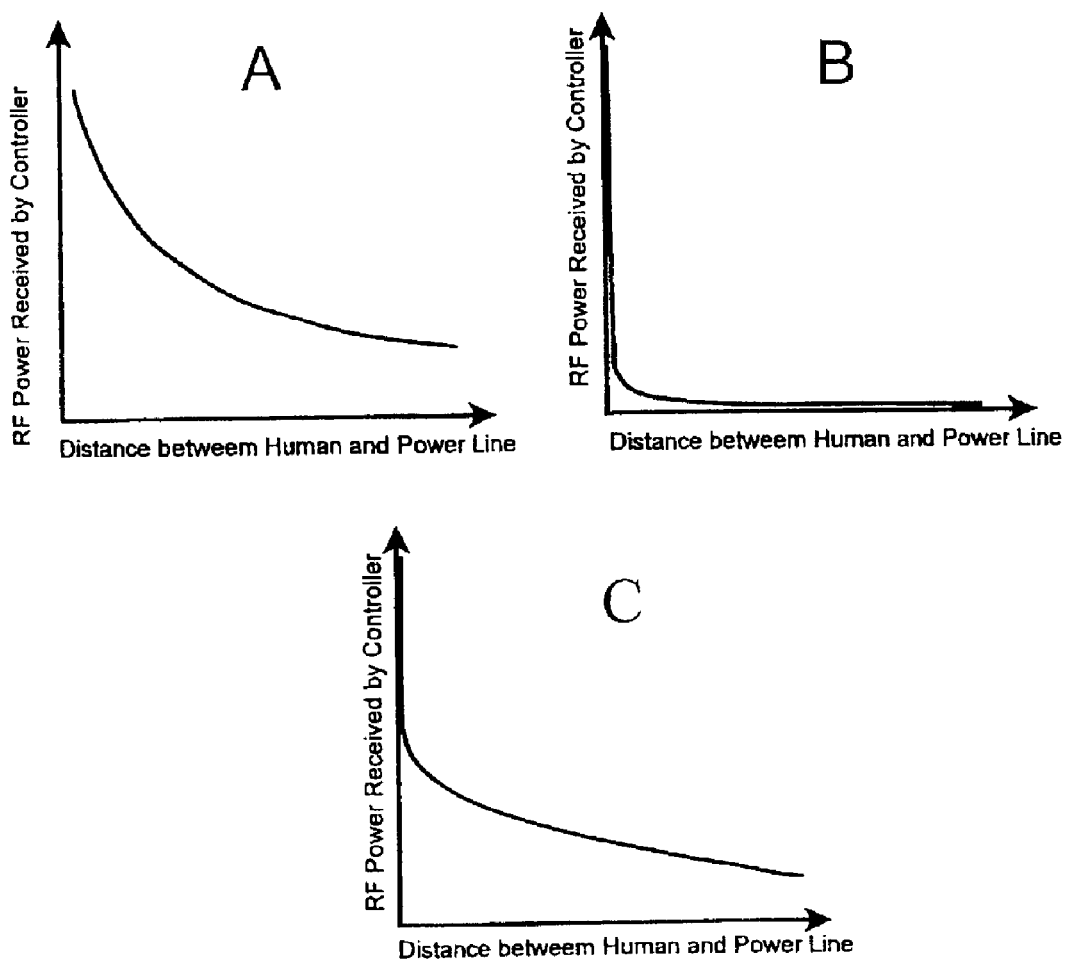
FIG. 4 provides graphs of RF power at the controller versus the distance between a human body and a power line. Panel A shows the high RF frequency signal as a function of distance; Panel B shows the low RF frequency signal as a function of distance; and Panel C shows a RF signal having information for both the proximity and electrical contact components.

For electrical contact protection, the T/R device transmits a low power coded LF signal through the human body into the air and reaches the controller via the following pathway: the T/R device to the human body to the air to the power line, and finally, to the controller. If there is no electrical contact between the human body and the power line, the LF signal level received by the controller is too low to activate the controller. If there is electrical contact between the worker's body and the power line, the following pathway is formed: the T/R device to the human body to the electrical contact to the power line, and finally to, the controller. In such a case, an appropriate amount of the LF signal arrives to the controller through the direct electrical contact. The curve of the LF power at the controller versus body distance is shown in FIG. 4B. The controller will be immediately activated by the LF signal upon electrical contact to cut off the line power by tripping a GFCI and/or a circuit breaker. The controller can be plugged into any receptacle on the power line without contacting any circuit breaker or GFCI. And the controller can trip an existing GFCI in the GFCI's minimum reaction time of about 16 to 20 milliseconds regardless of the strength of the electrical-contact AC current. The tripping mechanism trips the circuit breaker with a similar reaction time to that of a class A GFCI. The circuit breaker tripping reaction time can be adjusted by varying the strength of the line-neutral over-current. The greater the over-current, the shorter the circuit breaker tripping reaction time. This short reaction time can significantly reduce the worker's risk of ventricular fibrillation as well as the degree of the painful sensation caused by electrical shock. This present system configuration keeps the RF interference on the power system to a minimum. There are RF signals on the power line only when the worker approaches the power line. The disadvantage of this configuration is that the system is rather complicated with three different RF signals.

Figure 5:
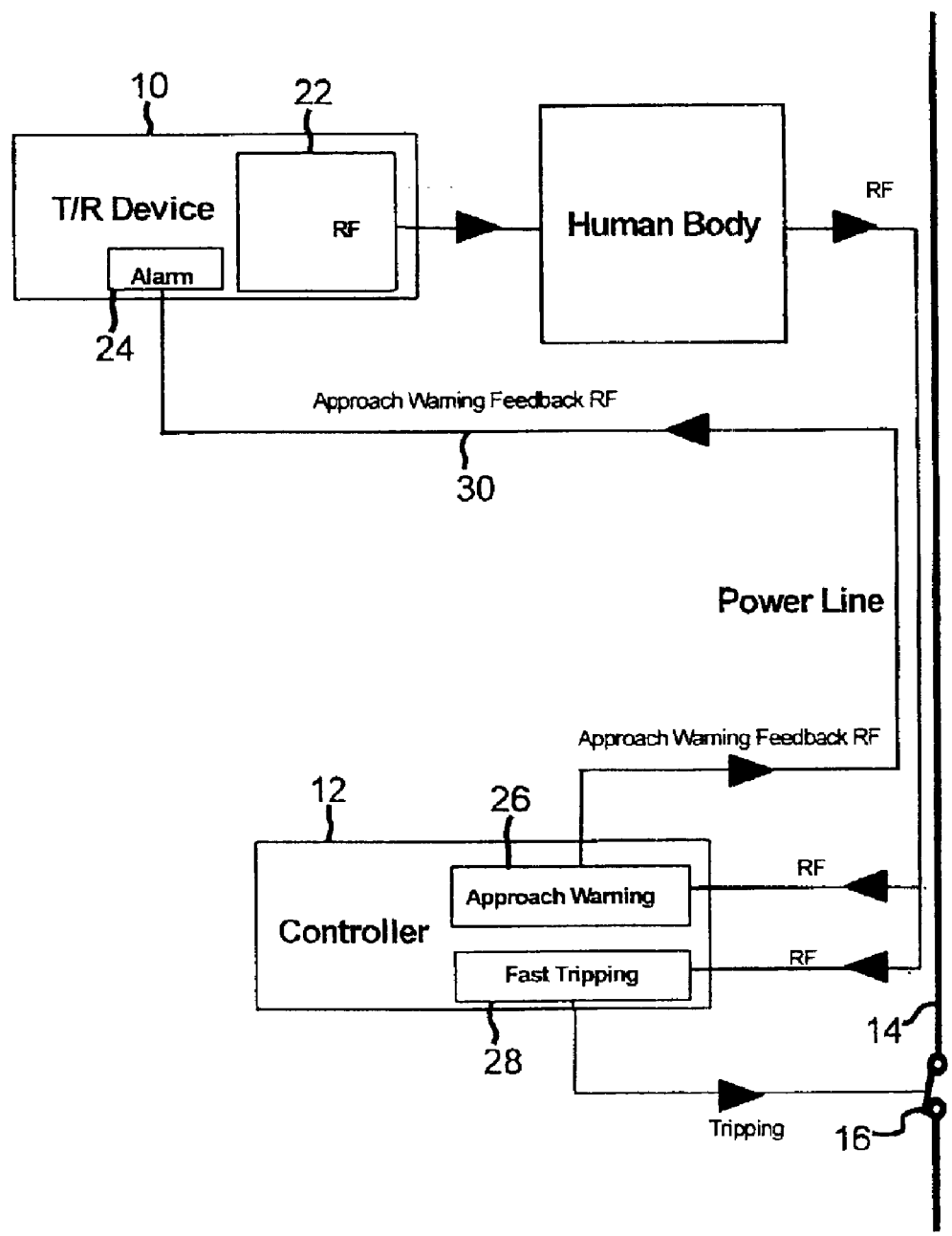
FIG. 5 illustrates another configuration of the present electrical injury protection system which uses the combined RF signal for both proximity and electrical contact sensing.

As shown in FIG. 4C, there exist some frequencies between the HF and LF range such that the RF power strength pattern at the controller versus the distance is a combination of the pattern in FIG. 4A and the pattern in FIG. 4B. Based on the RF power distribution shown in FIG. 4C, an alternative system configuration can be used as shown in FIG. 5 where one signal carries both proximity and electrical contact information. Accordingly, in one embodiment, the T/R device 10 transmits only one RF signal that carries both the body proximity and electrical-contact information. The preferred frequency range for this system is between about 100 kHz and about 1 MHz. At the controller 12, the approach warning mechanism 26 and the fast tripping mechanism 28 analyze the received combined-RF signal and extract proximity and electrical-contact information from the signal, respectively.

Figure 6:
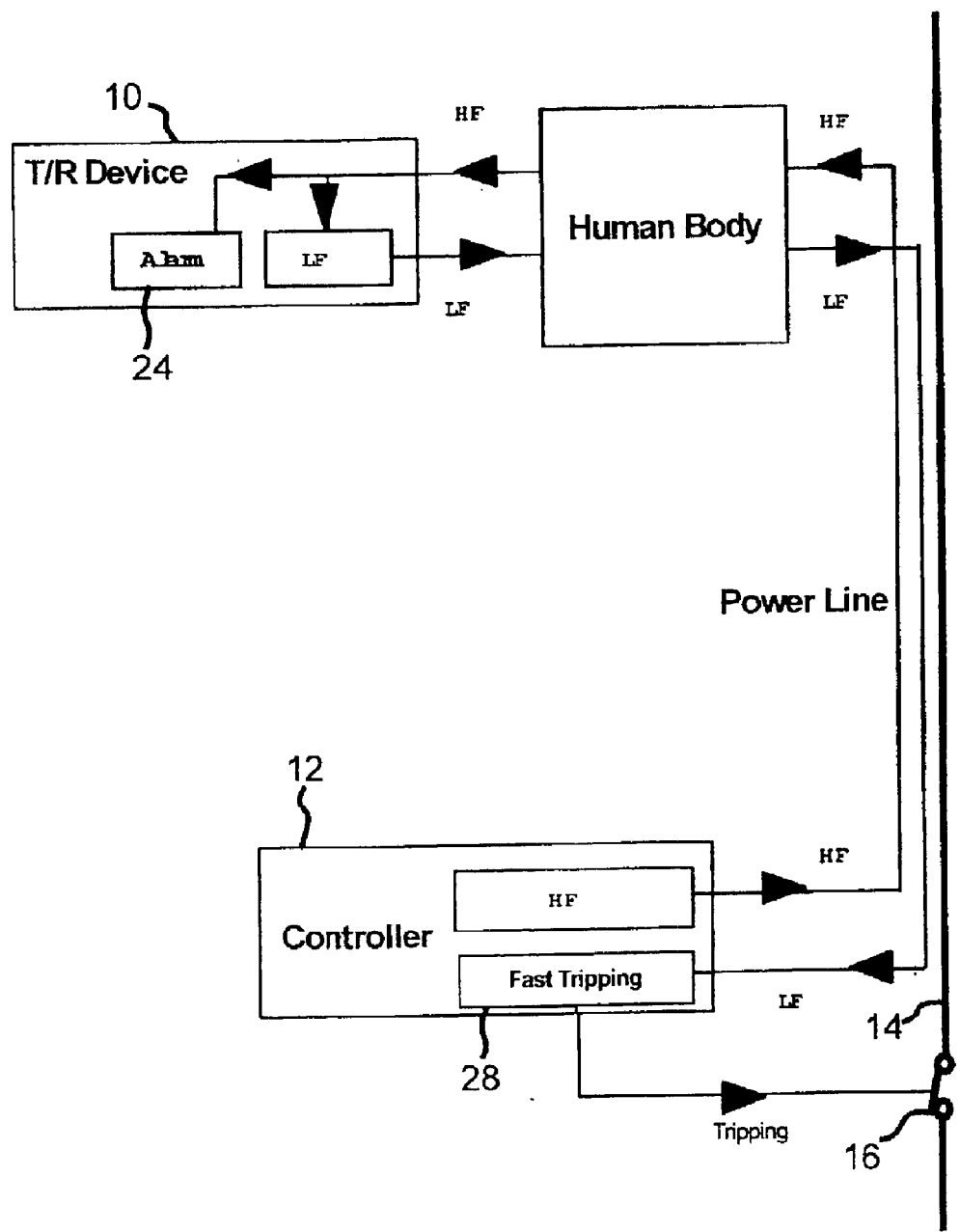
FIG. 6 illustrates another configuration of the present electrical injury protection system using high frequency for proximity sensing and low frequency for electrical-contact sensing.

Another alternative embodiment of the personal electrical injury prevention system is shown in FIG. 6. For delivering the body approach warning signal, the controller 12 transmits a HF pulse-coded signal through the power line 14 into the air. If the worker is too close to the power line, an appropriate amount of the HF signal arrives to the human body and is coupled to the T/R device 10 through the following pathway:controller 12 to the power line 14 to the air to the human body, and finally, to the T/R device 10. The HF power on the human body is directly related to the closeness of the human body to the power line. If the HF power 22 exceeds a specific level, it activates the T/R device alarm 24 and a warning signal is generated. Preferably, the warning signal is an audible signal with a pitch that varies as the worker gets closer to the power line. This excessive HF signal also activates the LF generator 21 of the T/R device 10 to transmit a pulse-coded LF signal to the human body. If there is no electrical contact between the human and the power line, no significant amount of LF power can reach the power line (see FIG. 4B). If there is electrical contact between the worker's body and the power line, an appropriate amount of the LF power arrives to the controller through the following pathway: the T/R device 10 to the human body to the electrical contact to the power line 14, and finally, to the controller. This LF signal activates the fast tripping mechanism 28 of controller 12 to immediately cut off the line power. The advantage of this alternative method is that its configuration is simpler than the system configuration illustrated in FIG. 2. The HF electromagnetic field around the power line, however, may interfere with other electrical appliances or equipment connected to the same power line. Careful selection of the frequency, bandwidth, and the modulation of the HF signal may reduce the RF interference to a negligible level.

Figure 7:
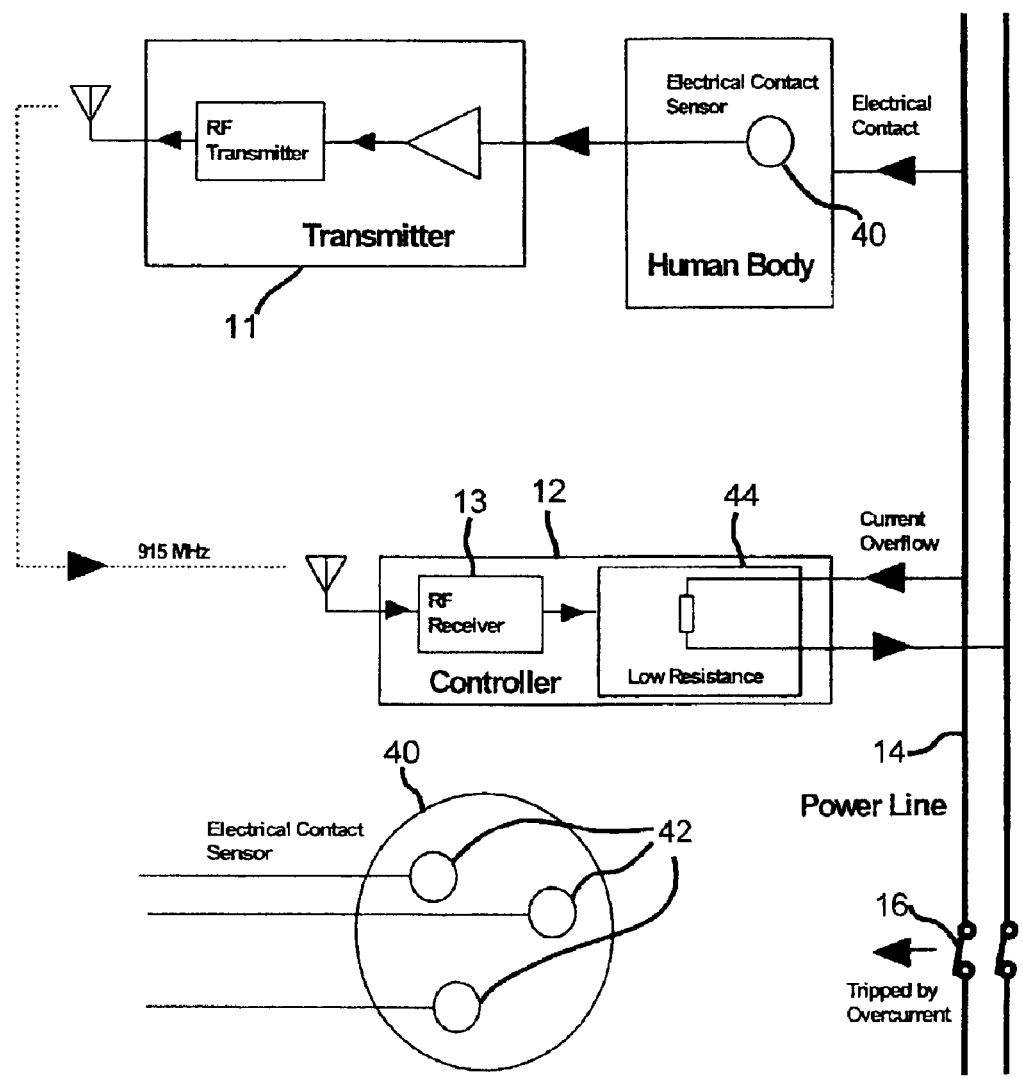
FIG. 7 illustrates yet another configuration of the present electrical injury protection system using human-body electrical-potential difference to detect electrical contact. The electrical contact sensor is shown in more detail at the bottom of the figure.

Another alternative embodiment of the personal electrical injury prevention system is shown in FIG. 7. This alternative embodiment provides electrical contact protection only. In this embodiment, a RF receiver component 13 is located within the controller 12. This alternative method is expected to be more reliable in detecting an electrical contact and is suitable for protecting electricians, construction workers, and others working near power lines which are not equipped with ground fault protection. The system consists of an electrical contact sensor 40 which is attached to a worker's body, a transmitter II carried by the worker, and a controller 12 which is plugged into any receptacle along the power line 14. In the specific embodiment shown in FIG. 7, the electrical contact sensor 40 is composed of three electrodes 42 which are attached to the worker's chest to pickup the body electrical potential difference between any two of electrodes 42. Of course, other numbers of electrodes as well as different locations on the body can be used. If there is any electrical current flow through the worker's chest, there must be a potential difference between two of the three electrodes. If the potential difference exceeds a specified threshold, it activates a RF transmitter 11 which immediately transmits a coded RF signal train through the air to the RF receiver 13 located within the controller 12. The RF frequency preferably is in the VHF or UHF Industrial Scientific and Medical (ISM) bands (e.g., about 915 MHz±13 MHz). When the controller 12 decodes the coded RF signal train, it immediately activates a fast-tripping mechanism 44 to cause an over-current in the power line. The fast-tripping mechanism 44 may comprise, for example, a low resistance unit such as a silicon controlled rectifier (SCR) which connects a low resistance resistor between line and neutral to cause an over-current in the power line. In an alternative embodiment, the fast tripping mechanism 44 comprises a triac device having two SCRs for use with AC current. In either case, the over-current will immediately trip the circuit breaker 16, thus protecting the worker from prolonged electrical shock. The system offers a significant advantage in that it can protect workers from prolonged electrical shock even without the existence of a GFCI. The disadvantage of the system is that it is not as convenient as the other systems (especially considering the attachment of the electrodes on, for example, a worker's chest) and that it does not provide proximity warning. The tripping reaction time is dependent on the tripping reaction time of the circuit breaker on the power line. As mentioned above, the reaction time of circuit breaker tripping is inversely related to the strength of the line-to-neutral over current such that increasing the strength of the over current decreases the reaction time. Thus, the actual reaction time of the circuit breaker is determined by the strength of the generated over current. The controller and its fast-tripping mechanism 44 should be designed to reduce the risk of fire caused by the over-current.

The system shown in FIG. 7 can also be used in power systems protected by GFCIs. In addition to generating an artificial line-to-neutral over-current, the fast-tripping mechanism 44 within a controller 12 may also generate an artificial line-to-ground current (desirably greater than 80 mA) to activate an SCR to connect a resistor between line and ground upon receiving the electrical contact signal. If the power system is equipped with a GFCI, this line-to-ground current can immediately trip the GFCI with the minimum reaction time (16–20 milliseconds).

The following example is intended to further illustrate the invention and not to limit it.

EXAMPLE

To demonstrate the feasibility of the present personal electrical injury prevention system, the RF transmission loss between a human body and a simulated power line was determined. The experimental setup consisted of a RF signal generator, a pair of conductive straps bound to a human subject's right wrist 10 cm apart, a 50-m AWG 12 simulated power line cable, and a spectrum analyzer with its input connected with the power line cable. During the experiment, an RF signal with 2 volts of amplitude and a sweeping frequency from 98.8 kHz to 40.6 MHz was transmitted from the signal generator to the pair of conductive straps bound on the subject's right wrist through a coaxial cable with grounded shielding. The RF signal was transmitted via the subject's body into the air. The subject first laid his/her right hand on the power line insulation, and the spectrum analyzer, which was connected to the power line cable, measured the transmission loss at all sweeping frequency points. Then the subject distanced his/her hand from the cable in small increments; the spectrum analyzer repeated the measurement at each distance step.

Figure 8:
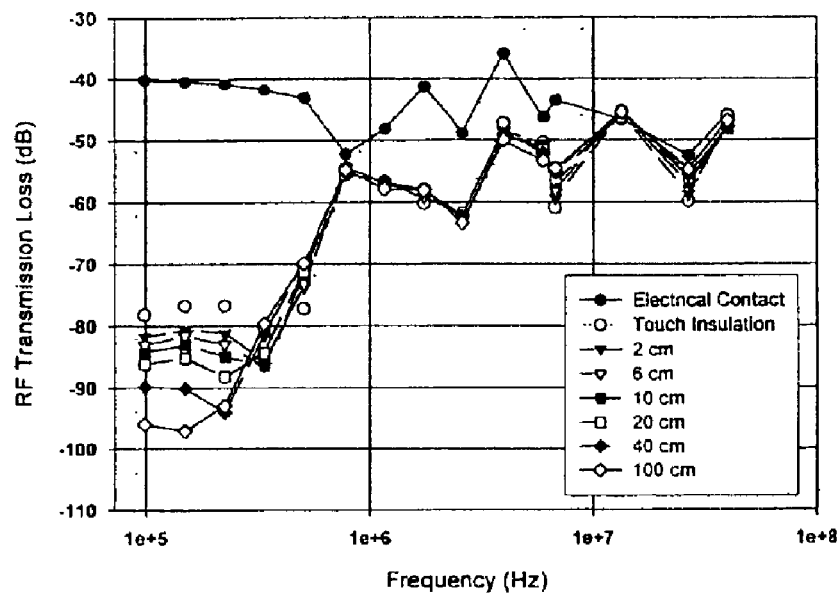
FIG. 8 is a plot showing mean transmission loss versus frequency and distance based on experiments described in the Example.
Figure 9:
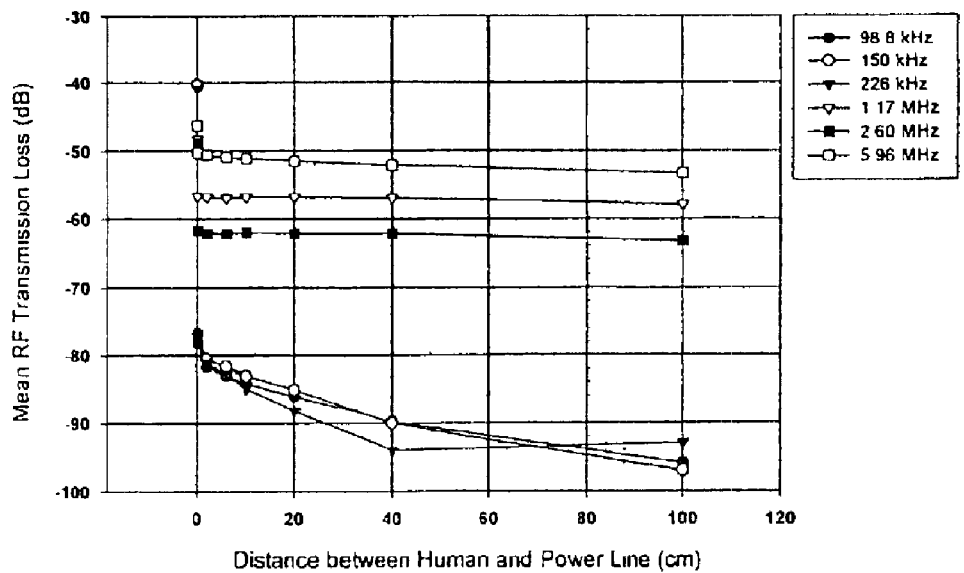
FIG. 9 is a plot showing mean transmission loss versus distance for selected frequencies based on the same data as shown in FIG. 8.

The RF transmission loss measurements were conducted on nine human subjects. RF transmission loss data were plotted versus frequency at various distances between the body and the cable in FIG. 8. The same data was also plotted in FIG. 9 for selected frequencies. The results in FIGS. 8 and 9 show that under the measurement conditions, the optimal frequency range is between 98 and 200 kHz (see FIG. 8). At 150 kHz, the RF transmission loss monotonically increased from −76.7 dB to −97.0 dB as a subject's hand moved from the power line insulation to 100 cm away. As the RE further increased beyond 200 kHz, because of the increased RF radiation, the dynamic range of RF transmission loss versus distance became much narrower, and the transmission loss curve was not necessarily monotonic. At 5.9 MHz, the transmission loss curve is barely monotonic. But at these higher frequencies, such as 5.9 MHz, the transmission pattern is very complex and drastically varies under slightly different test conditions, due to RF radiation and RF standing waves on the power line. Thus, it is better to select lower frequencies as the optimal frequency range in order to obtain a more stable RF transmission pattern. This transmission loss pattern would be up-shifted several hundred kHz along the frequency axis as the signal generator output was changed from the present grounded unbalanced output to un-grounded balanced output.

We claim:

1. A personal electrical injury protection system for use by an individual working near a power line, the system comprising:

a radio frequency transmitter mounted on the individual's body for generating a radio signal, at least two electrodes connecting the radio frequency transmitter to the individual's body such that the body acts as an antenna for transmitting the radio signal, the radio signal carrying at least information relating to the individual's proximity to the power line;

a controller electrically connected to the power line for receiving the radio signal, wherein the controller comprises an approach warning mechanism to monitor the radio signal for proximity information; and an alarm operatively coupled to the controller wherein, if the approach warning mechanism detects that the radio signal is greater than a first threshold value, an approach warning signal is generated which is transmitted to the alarm and activates the alarm to warn the individual of a close approach to the power line.

2. The personal electrical injury protection system of claim 1 wherein the radio signal carries information relating to the individual's electrical contact with the power line and the controller comprises a quick tripping mechanism to monitor the radio signal for electrical contact information wherein, if the quick tripping mechanism detects that the radio signal is greater than a second threshold value, the power line is de-energized to minimize electrical injury to the individual.

3. The personal electrical injury protection system of claim 1 wherein the radio signal is in the range from about 100 kHz to about 1 MHz.

4. The personal electrical injury protection system of claim 2 wherein the radio signal comprises a low frequency radio signal for carrying information relating to the individual's electrical contact with the power line and a high frequency radio signal for carrying information relating to individual's proximity to the power line and wherein the approach warning mechanism is operable to receive the high frequency radio signal and the quick tripping mechanism is operable to receive the low radio frequency signal.

5. The personal electrical injury protection system of claim 1 wherein the alarm is carried by and electrically coupled to the transmitter.

6. The personal electrical injury protection system of claim 1 wherein the alarm is electrically coupled to the approach warning mechanism.

7. The personal electrical injury protection system of claim 1, wherein the alarm is a variable pitch audible alarm which provides a higher pitch audio output the closer the individual approaches the power line.

8. The personal electrical injury protection system of claim 2 wherein the quick tripping mechanism de-energizes the power line by causing an artificial line-ground current to trip a ground fault circuit interrupter on the power line in the minimum tripping delay time of the ground fault circuit interrupter.

9. The personal electrical injury protection system of claim 2, wherein the quick tripping mechanism has a delay time of less than about 20 milliseconds to de-energize the power line.

10. The personal electrical injury protection system of claim 1, wherein the radio frequency transmitter is battery powered.

11. The personal electrical injury protection system of claim 1, wherein the radio frequency transmitter can be mounted on a belt, tool holster, helmet, or shoe or can fit into a shirt or other pocket.

12. The personal electrical injury protection system of claim 10, wherein the radio frequency transmitter can be mounted on a belt, tool holster, helmet, or shoe or can fit into a shirt or other pocket.

13. The personal electrical injury protection system of claim 10, wherein the radio frequency transmitter has a low-battery warning light or other alarm.

14. The personal electrical injury protection system of claim 12, wherein the radio frequency transmitter has a low-battery warning light or other alarm.

15. The personal electrical injury protection system of claim 4, wherein the high frequency radio signal is in the range of 200 kHz to about 2 MHz and the low frequency radio signal is in the range of about 50 kHz to about 200 kHz.

16. The personal electrical injury protection system of claim 1, wherein the controller is electrically connected to the power line through an outlet on the power line.

17. The personal electrical injury protection system of claim 2, wherein the quick tripping mechanism de-energizes the power line when electrical contact is detected by automatically causing an artificial line-neutral over-current to trip a circuit breaker on the power line.

18. The personal electrical injury protection system of claim 2, wherein the quick tripping mechanism de-energizes the power line when electrical contact is detected by automatically causing an artificial line-neutral over-current by controlling a silicon controlled rectifier connected to a low-resistant resistor between line and neutral of the power line.

19. The personal electrical injury protection system of claim 2, wherein the quick tripping mechanism de-energizes the power line when electrical contact is detected by automatically causing an artificial line-ground current to trip a ground fault circuit interrupter on the power line.

20. The personal electrical injury protection system of claim 2, wherein the quick tripping mechanism de-energizes the power line when electrical contact is detected by automatically causing an artificial line-ground current to trip a ground fault circuit interrupter on the power line by controlling a silicon controlled rectifier connected to a low-resistant resistor between line and ground of the power line.

21. A personal electrical injury protection system for use by an individual working near a low voltage power line, the system comprising:
 (1) a radio frequency transmitter mounted on the individual's body and having a low frequency signal generator for generating a low frequency signal, at least two electrodes connecting the radio frequency transmitter to the individual's body, and an alarm; and
 (2) a controller electrically connected to the power line for receiving the low frequency signal from the low frequency signal generator, wherein the controller has a quick tripping mechanism to monitor the low frequency signal from the low frequency signal generator;
 wherein the low frequency signal carries information relating to the individual's electrical contact with the power line, and
 wherein, if the quick tripping mechanism detects that the low frequency signal is greater than a predetermined threshold, the power line is de-energized to minimize electrical injury to the individual.

22. The personal electrical injury protection system of claim 21, wherein the radio frequency transmitter and the low frequency signal generator are contained in a combined radio frequency transmitter and receiver unit which can be worn by the individual.

23. The personal electrical injury protection system of claim 21, wherein the quick tripping mechanism has a delay time of less than about 20 milliseconds to de-energize the power line.

24. The personal electrical injury protection system of claim 21, wherein the radio frequency transmitter is battery powered.

25. The personal electrical injury protection system of claim 24, wherein the radio frequency transmitter has a low-battery warning light or other alarm.

26. The personal electrical injury protection system of claim 24, wherein the radio frequency transmitter can be mounted on a belt, tool holster, helmet, or shoe or can fit into a shirt or other pocket.

27. A personal electrical injury protection system for use by an individual working near a power line, the system comprising:
 a radio frequency transmitter mounted on the individual's body for generating a radio signal, at least two electrodes connecting the radio frequency transmitter to the individual's body such that the body acts as an antenna for transmitting the radio signal, the radio signal carrying at least information relating to the individual's electrical contact with the power line; and
 a controller electrically connected to the power line for receiving the radio signal, wherein the controller comprises a fast tripping mechanism to monitor the radio signal for electrical contact information and wherein the fast tripping mechanism causes an artificial line-neutral over current to trip a circuit breaker on the power line when the radio signal is greater than a threshold value.

28. A personal electrical injury protection system for use by an individual working near a low voltage power line, the system comprising:
 a radio frequency transmitter mounted on the individual's body and having a low frequency signal generator for generating a low frequency radio signal, at least two electrodes connecting the radio frequency transmitter to the individual's body such that the body acts as an antenna for transmitting the low frequency radio signal, a receiver, and an alarm; and a controller electrically connected to the power line for receiving the low frequency radio signal from the radio frequency transmitter, the controller having a high frequency signal generator for generating and transmitting a high frequency radio signal, wherein the receiver of the radio frequency transmitter monitors the high frequency radio signal from the controller and the controller has a quick tripping mechanism to monitor the low frequency radio signal from the radio frequency transmitter;

wherein the high frequency radio signal carries information relating to the individual's proximity to the power line and the low frequency radio signal carries information relating to the individual's electrical contact with the power line, wherein, if the the radio frequency transmitter detects that the high frequency radio signal is greater than a first threshold value, an approach warning signal is generated which is transmitted to the alarm and activates the alarm to warn the individual of a close approach to the power line, and wherein, if the quick tripping mechanism detects that the low frequency radio signal is greater than a second threshold, the power line is de-energized to minimize electrical injury to the individual.

29. The personal electrical injury protection system of claim 27, wherein:

the controller is operable to generate a radio signal carrying at least information relating to the individual's proximity to the power line;

the radio frequency transmitter comprises an alarm and is operable to receive the signal from the controller, wherein the transmitter activates the alarm if the signal from the controller exceeds a predetermined value.

30. The personal electrical injury protection system of claim 29, wherein the signal generated by the controller is a high frequency signal, and the signal generated by the radio frequency transmitter is a low frequency signal.

31. The personal electrical injury protection system of claim 30, wherein the high frequency signal is in the range of about 200 KHz to about 2 MHz and the low frequency signal is in the range of about 50 kHz to about 200 kHz.

32. The personal electrical injury protection system of claim 27, wherein:

the controller is operable to generate a radio signal carrying at least information relating to the individual's proximity to the power line; and the radio frequency transmitter is operable to receive the signal from the controller, wherein the transmitter generates said signal carrying at least information relating to the individual's electrical contact with the power line if the signal from the controller exceeds a predetermined value.

33. A personal electrical injury protection system for use by an individual working near a low voltage power line, the system comprising:

(1) a radio frequency transmitter mounted on the individual's body and having a low frequency signal generator, a high frequency signal generator, at least two electrodes connecting the radio frequency transmitter to the individual's body, and an alarm;

(2) a radio frequency receiver to pick up the low frequency radio signal and high frequency radio signal from the radio transmitter; and (3) a controller electrically connected to the power line and electrically connected to the radio frequency receiver for receiving the low frequency signal and the high frequency signal from the radio frequency receiver, wherein the controller has an approach warning mechanism to monitor the high frequency signal from the receiver and a quick tripping mechanism to monitor the low frequency signal from the receiver;

wherein the high frequency signal carries information relating to the individual's proximity to the power line and the low frequency signal carries information relating to the individual's electrical contact with the power line, wherein, if the approach warning mechanism detects that the high frequency signal is greater than a first threshold value, an approach warning signal is generated which is transmitted to the alarm and activates the alarm to warn the individual of a close approach to the power line, and wherein, if the quick tripping mechanism detects that the low frequency signal is greater than a second threshold, the power line is de-energized to minimize electrical injury to the individual.

* * * * *

UNITED STATES PATENT AND TRADEMARK OFFICE
CERTIFICATE OF CORRECTION

PATENT NO. : 6,897,783 B2
DATED : May 24, 22005
INVENTOR(S) : Zeng et al.

It is certified that error appears in the above-identified patent and that said Letters Patent is hereby corrected as shown below:

Column 10,
Line 59, "a transmitter II carried by the worker," should be -- a transmitter 11 carried by the worker, --.

Column 12,
Line 10, "As the RE further" should be -- As the RF further --.

Signed and Sealed this

Twenty-fourth Day of January, 2006

JON W. DUDAS
*Director of the United States Patent and Trademark Office*